(12) United States Patent
Moon (10) Patent No.: US 7,099,267 B2
(45) Date of Patent: Aug. 29, 2006

(54) ENHANCED FREQUENCY DOMAIN EQUALIZATION IN OFDM COMMUNICATION

(75) Inventor: Jaekyun Moon, Plymouth, MN (US)

(73) Assignee: DSP Group Inc., Santa Clara, CA (US)

( * ) Notice: Subject to any disclaimer, the term of this patent is extended or adjusted under 35 U.S.C. 154(b) by 515 days.

(21) Appl. No.: 10/112,916

(22) Filed: Mar. 29, 2002

(65) Prior Publication Data

US 2003/0039203 A1 Feb. 27, 2003

Related U.S. Application Data

(60) Provisional application No. 60/314,813, filed on Aug. 23, 2001.

(51) Int. Cl.
*H04J 11/00* (2006.01)
*H04Q 7/24* (2006.01)

(52) U.S. Cl. .................. 370/206; 370/252; 370/338

(58) Field of Classification Search ............... 370/203, 370/206, 208, 209, 210, 338; 375/260, 261, 375/345; 455/226.1–4, 230, 231, 232.1
See application file for complete search history.

(56) References Cited

U.S. PATENT DOCUMENTS

| | | | |
|---|---|---|---|
| 5,796,814 A | 8/1998 | Brajal et al. | |
| 6,141,393 A | 10/2000 | Thomas et al. | |
| 6,182,251 B1 | 1/2001 | Rahnema et al. | |
| 6,441,786 B1 * | 8/2002 | Jasper et al. | 342/383 |
| 6,496,144 B1 * | 12/2002 | Tanaka et al. | 342/378 |
| 6,549,583 B1 * | 4/2003 | Crawford | 375/260 |
| 6,563,885 B1 * | 5/2003 | Magee et al. | 375/316 |
| 6,603,734 B1 * | 8/2003 | Oksanen | 370/203 |

OTHER PUBLICATIONS

"High-speed Physical Layer in the 5 GHz Band" Part 11: Wireless LAN Medium Acces Control (MAC) and Physical Layer (PHY) specifications, IEEE Std 802.11a-1999.
"Wireless OFDM Systems" Lecture by Prof. Robert W. Heath, Jr., Telecommunications and Signal Processing Research Center, The University of Texas at Austin, http://wireless.ece.utexas.edu/~bevans/courses/realtime/lectures/20_OFDM, Nov. 2001.
"Wireless OFDM LAN," Vocal Technologies, Ltd., IEEE 802.11a-0004A-1, 2001.
"OFDM Channel Estimation by Singular Value Decomposition" O. Edfors et al., IEEE Trans. Comm. vol. 46, No. 7, Jul. 1998.
"Channel Estimation for OFDM Systems Based on Comb-Type Pilot Arrangement in Frequency Selective Fading Channels" M. H. Hsieh and C. H. Wei, IEEE Trans. Consumer Electric, vol. 44, No. 1, Feb. 1998.

* cited by examiner

*Primary Examiner*—Doris H. To
*Assistant Examiner*—Soon D. Hyun
(74) *Attorney, Agent, or Firm*—Shumaker & Sieffert, P.A.

(57) ABSTRACT

A technique for enhanced frequency domain equalization in an OFDM communication receiver enables derivation of a more accurate estimate of channel gain fluctuation by adding an additional frequency tone observation to the estimate. For example, the technique may involve estimation of an unknown, complex, channel-induced gain A based on observation of complex amplitude values for first and second preamble symbols transmitted in an OFDM frame, plus the complex amplitude value for a signal field in the OFDM frame. The enhanced frequency domain equalization technique may be especially useful in a network conforming to the IEEE 802.11a standard.

76 Claims, 3 Drawing Sheets

ENHANCED FREQUENCY DOMAIN EQUALIZATION IN OFDM COMMUNICATION

This application claims priority from U.S. provisional application Ser. No. 60/314,813, filed Aug. 23, 2001, the entire content of which is incorporated herein by reference.

FIELD

The invention relates to wireless communication and, more particularly, to frequency domain equalization of orthogonal frequency division multiplexing (OFDM) signals.

BACKGROUND

Wireless communication involves transmission of encoded information on a modulated radio frequency (RF) carrier signal. In a multi-carrier wireless communication system, such as an OFDM system, transmitted signals are susceptible to multi-path scattering and reflection, which can cause interference between information transmitted on different channels. For this reason, OFDM receivers typically include a channel estimator that measures fluctuation of the channel response. The receiver uses the measured channel response to adjust the detection of incoming signals, and thereby compensate for channel effects that could otherwise cause interference.

According to the IEEE 802.11a standard, fluctuation of the channel response that acts on a specific frequency bin is estimated using a number of known, repeatedly transmitted preamble symbols, or "tones." For example, an IEEE 802.11a receiver estimates channel fluctuation in a given frequency bin by comparing the received (complex) amplitudes of the tone with the known amplitude of the preamble tone transmitted twice for a particular frequency bin. The estimated amount of channel fluctuation then is compensated by dividing the received value of the tone by the estimated gain term before the detector processes each tone. This operation is known as frequency domain equalization.

SUMMARY

The invention is directed to a technique for enhanced frequency domain equalization in an OFDM communication receiver. The enhanced frequency domain equalization technique enables derivation of a more accurate estimate of channel gain fluctuation by adding an additional frequency tone observation to the estimate. For example, the technique may involve estimation of an unknown, complex, channel-induced gain A. The gain A is based on observation of complex amplitude values for first and second preamble symbols transmitted in an OFDM frame, plus the complex amplitude value for a signal field in the OFDM frame. In this manner, the gain is determined based on observation of the amplitudes of preamble symbols and a non-preamble symbol.

The preamble symbols may be the two "long" preamble signals in the physical layer convergence procedure (PLCP) preamble in a signal transmitted according to the IEEE 802.11a standard. The signal field may be, for example, the signal field that carries a symbol encoding rate and length information in an IEEE 802.11a frame. The signal field contains information that is necessary to decode the 802.11a frame. Advantageously, the signal field runs at a low, and thus reliable, transmission rate. Also, the signal field is modulated using binary phase shift keying (BPSK).

In general, there is no way to determine the tone values associated with the signal field with 100% certainty at the receiver side. At reasonable operating conditions, however, the receiver can make a reliable guess as to whether a received tone is supposed to be +1 or −1, e.g., by a simple slicing operation. The determined, "expected" tone value then can be treated as the actual transmitted value, and accepted as a third tone value observation for the specific frequency bin of interest for frequency domain equalization. Thus, in addition to the two observations corresponding to the preamble symbols, the technique makes use of another observation of the same frequency tone but corresponding to the signal field, promoting increased accuracy.

In one embodiment, the invention provides a method comprising obtaining an amplitude y1 for a first preamble symbol in an orthogonal frequency division multiplexing (OFDM) frame transmitted via a wireless channel, obtaining an amplitude y2 for a second preamble symbol in the OFDM frame, obtaining an amplitude y3 for a signal field in the OFDM frame, and estimating a complex gain A for the channel according to the equation:

$$A=[x^*(y1+y2)+z^*y3]/(2|x|^2+|z|^2),$$

wherein x is a known value corresponding to a transmission amplitude for each of the first and second preamble symbols, and z is an expected value corresponding to a transmission amplitude for the signal field.

In another embodiment, the invention provides a system comprising a receiver that obtains an amplitude y1 for a first preamble symbol in an orthogonal frequency division multiplexing (OFDM) frame transmitted via a wireless channel, obtains an amplitude y2 for a second preamble symbol in the OFDM frame, and obtains an amplitude y3 for a signal field in the OFDM frame, and a channel estimator that estimates a complex gain A for the channel according to the equation:

$$A[x^*(y1+y2)+z^*y3]/(2|x|2+|z|2),$$

wherein x is a known value corresponding to a transmission amplitude for each of the first and second preamble symbols, and z is an expected value corresponding to a transmission amplitude for the signal field.

In a further embodiment, the invention provides a method comprising obtaining amplitudes for at least three different symbols in an orthogonal frequency division multiplexing (OFDM) frame transmitted via a wireless channel, and estimating a complex gain for the channel based on the amplitudes.

In an added embodiment, the invention provides a system comprising a receiver that obtains amplitudes for at least three different symbols in an orthogonal frequency division multiplexing (OFDM) frame transmitted via a wireless channel, and a channel estimator that estimates a complex gain based on the amplitudes.

In another embodiment, the invention provides a machine-readable medium comprising instructions to cause a processor to obtain an amplitude y1 for a first preamble symbol in an orthogonal frequency division multiplexing (OFDM) frame transmitted via a wireless channel, obtain an amplitude y2 for a second preamble symbol in the OFDM frame, obtain an amplitude y3 for a signal field in the OFDM frame, and estimate a complex gain A for the channel according to the equation:

$$A=[x^*(y1+y2)+z^*y3]/(2|x|^2+|z|^2),$$

wherein x is a known value corresponding to a transmission amplitude for each of the first and second preamble symbols, and z is an expected value corresponding to a transmission amplitude for the signal field.

In a further embodiment, the invention provides a machine-readable medium comprising instructions to cause a processor to obtain amplitudes for at least three different symbols in an orthogonal frequency division multiplexing (OFDM) frame transmitted via a wireless channel.

In another embodiment, the invention provides a method comprising obtaining an amplitude for a preamble symbol in an orthogonal frequency division multiplexing (OFDM) frame transmitted via a wireless channel, obtaining an amplitude for a non-preamble symbol in the OFDM frame, and estimating a complex gain for the channel based on the amplitudes of the preamble symbol and the non-preamble symbol.

In an added embodiment, the invention provides a system comprising a receiver that obtains an amplitude for a preamble symbol in an orthogonal frequency division multiplexing (OFDM) frame transmitted via a wireless channel, and obtains an amplitude for a non-preamble symbol in the OFDM frame, and a channel estimator that estimates a complex gain for the channel based on the amplitudes of the preamble symbol and the non-preamble symbol.

In a further embodiment, a machine-readable medium comprising instructions to cause a processor to obtain an amplitude for a preamble symbol in an orthogonal frequency division multiplexing (OFDM) frame transmitted via a wireless channel, obtain an amplitude for a non-preamble symbol in the OFDM frame, and estimate a complex gain for the channel based on the amplitudes of the preamble symbol and the non-preamble symbol.

The invention may provide one or more advantages. In particular, an enhanced frequency domain equalization technique can significantly improve the accuracy of the complex gain estimate for a particular frequency bin, e.g., on the order of 1.76 dB. In turn, the improved accuracy of the estimate can improve detector performance, and reduce the effects of inter-symbol interference in an OFDM wireless receiver. In this manner, the invention may offer improved bandwidth for wireless communication applications such as wireless local area networking.

Additional details of various embodiments are set forth in the accompanying drawings and the description below. Other features, objects and advantages will become apparent from the description and drawings, and from the claims.

DETAILED DESCRIPTION

Figure 1:
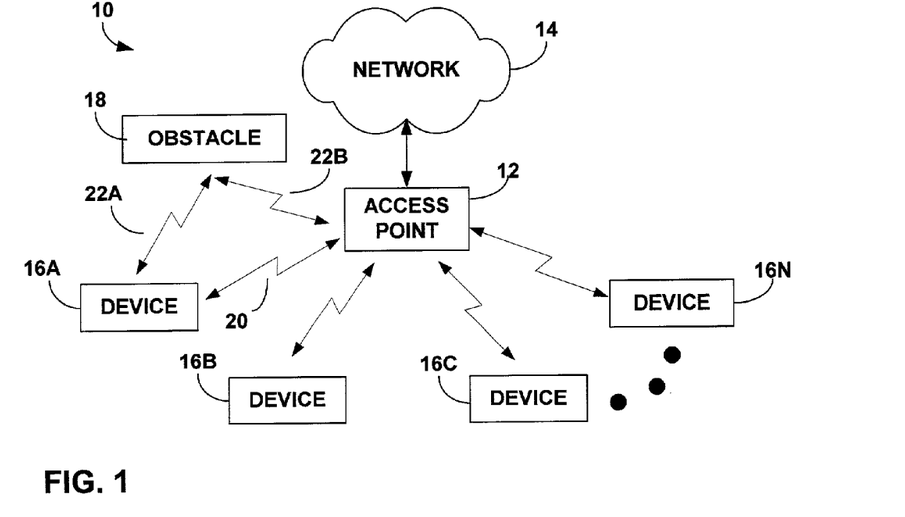
FIG. 1 is a block diagram illustrating a wireless communication network.

FIG. 1 is a block diagram illustrating a wireless communication network 10. As shown in FIG. 1, wireless communication network 10 may include a wireless access point 12 coupled to a wired network 14. Wireless access point 12 permits wireless communication between wired network 14 and one or more wireless communication devices 16A–16N (hereinafter 16). Wireless access point 12 may integrate a hub, switch or router to serve multiple wireless communication devices 16. Wireless communication network 10 may be used to communicate data, voice, video and the like between devices 16 and network 14 according to a variety of different wireless transmission formats. Network 14 may be a local area network, wide area network or global network such as the Internet.

As further shown in FIG. 1, access point 12 and wireless communication devices 16 may transmit signals via one or more paths. For example, access point 12 transmits a signal to WCD 6A via a first path 20, as well a second path (22A, 22B) caused by reflection of the signal from an obstacle 18. Obstacle 18 may be a structure such as a building, bridge, car, or even a person. Transmission of signals along multiple paths in a multi-carrier communication system can introduce inter-symbol interference, sometimes referred to as ISI.

For this reason, wireless communication devices 16 and access point 12 each include a channel estimator (not shown in FIG. 1) that measures channel response fluctuation. The channel estimator uses the measured channel response to perform frequency domain equalization, and compensate for channel effects that could cause inter-symbol interference. In accordance with the invention, access point 12 and wireless communication devices 16 may include a channel estimator that performs a technique for enhanced frequency domain equalization, to promote greater accuracy.

Figure 2:
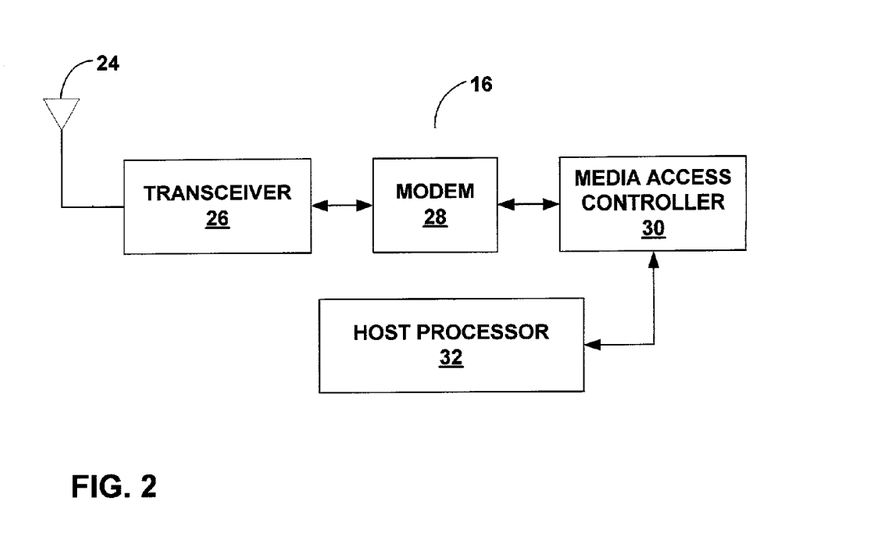
FIG. 2 is a block diagram illustrating a wireless communication device.

FIG. 2 is a block diagram illustrating a wireless communication device 16 in further detail. As shown in FIG. 2, wireless communication device 16 may include an RF antenna 24, a transceiver 26, modem 28, and media access controller 30 coupled to a host processor 32. Wireless communication devices 16 may take the form of a variety of wireless equipment, such as computers, personal computer cards, e.g., PCI or PCMCIA cards, personal digital assistants (PDAs), network audio or video appliances, and the like.

RF antenna 24 transmits and receives RF signals. Transceiver 26 may include circuitry for upconverting signals to RF for transmission, and downconverting received RF signals to baseband for processing. Modem 28 decodes information from an RF signal received via antenna 18 and downconverted to baseband by transceiver 26. Media access controller 30 interacts with host processor 32 to facilitate communication between modem 28 and a host wireless communication device 16, e.g., a computer, PDA or the like. Hence, host processor 32 may be a CPU within a computer or some other device. Transceiver 26, modem 28 and media access controller 30 may be integrated on a common integrated circuit chip, or realized by discrete components.

Wireless communication network 10 (FIG. 1), access point 12, and wireless communication device 16 (FIG. 2) may conform to a wireless networking standard for orthogonal frequency division multiplexed (OFDM) communication, such as the IEEE 802.11a standard. The IEEE 802.11a standard specifies a format for the radio frequency (RF) transmission of OFDM data. The OFDM symbols transmitted according to the IEEE 802.11a standard occupy a 20 MHz bandwidth, which is divided into 64 equally spaced frequency bands. In multi-path environments, an OFDM system can be susceptible to inter-symbol interference and performance degradation.

Figure 3:
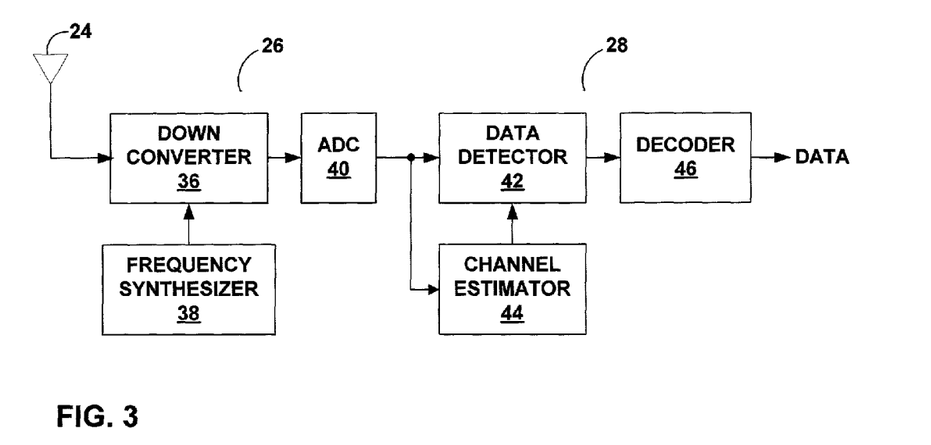
FIG. 3 is a block diagram illustrating exemplary demodulation circuitry associated with the device of FIG. 2.

FIG. 3 is a block diagram illustrating exemplary demodulation circuitry associated with the device of FIG. 2. As shown in FIG. 3, transceiver 26 includes a downconverter 36 that receives an RF signal via antenna 24. Downconverter 36 mixes the received RF signal with a signal received from a frequency synthesizer 38 to convert the RF signal down to a baseband frequency. Transceiver 26 also may include a low noise amplifier and other signal conditioning circuitry (not shown in FIG. 4). Transceiver 20 also includes an analog-to-digital converter (ADC) 40 that produces a digital representation of the baseband signal for application to modem 28.

Modem 28 includes a detector 42 and a channel estimator 44, each of which receives a digital representation of the baseband signal from ADC 40. Detector 42 performs adaptive symbol detection in response to input from channel estimator 56. In particular, channel estimator 44 estimates a complex gain A for a particular frequency bin that corresponds to the transmitted signal information. In effect, detector 42 divides the received amplitude value of a tone by the estimated gain term before processing the tone, to correct for channel fluctuations.

A decoder 46 then decodes the information carried by the tone and produces a stream of serial data for transmission to host processor 32 (FIG. 2). In this manner, modem 28 corrects for channel fluctuations and reduces inter-symbol interference. Detector 42 (FIG. 3) can make use of the estimated channel gain from channel estimator 44 in a conventional manner. In accordance with the invention, however, channel estimator 44 produces the channel gain estimate using an enhanced technique that relies on an additional tone observation to provide increase accuracy. For example, in the case of an 802.11a frame, channel estimator 44 makes use of first and second long preamble tones and a signal field tone to provide a more accurate estimate of channel response. Detector 42, channel estimator 44 and decoder 46 may be formed as logic circuitry on independent or common integrated circuit chips, programmed features of a processor such as a digital signal processor (DSP), or a combination of both.

Figure 4:
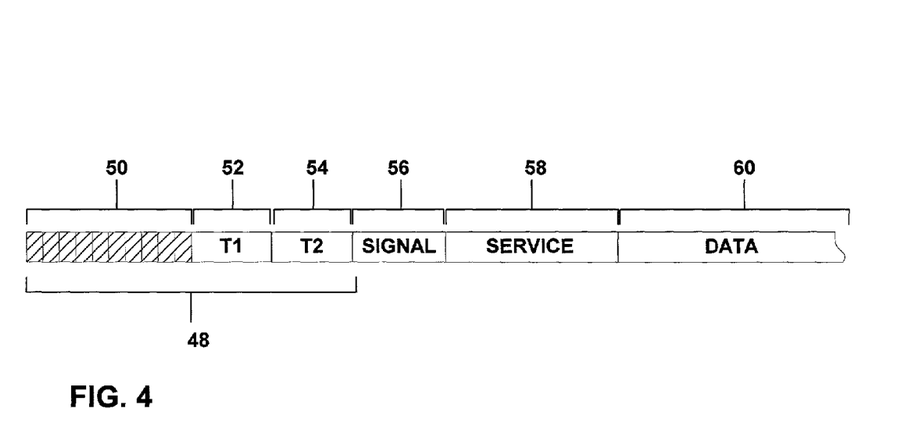
FIG. 4 is a diagram of an OFDM frame transmitted according to the IEEE 802.11a standard.

FIG. 4 is a diagram of an OFDM frame transmitted according to the IEEE 802.11a standard. As shown in FIG. 4, the OFDM frame includes a physical layer convergence procedure (PLCP) preamble 48 that contains ten short preamble symbols 50, or "tones," and two long preamble tones T1, T2 (52, 54). A signal field 56 follows long preamble symbols 52, 54, and contains a symbol encoding rate and length information for the OFDM frame. A service field 58 follows signal field 56. Finally, a data field 60 containing the data "payload" for the OFDM frame follows service field 58.

An enhanced frequency domain equalization technique, in accordance with the invention, relies on not only the long preamble symbols 52, 54, but also a non-preamble symbol within signal field 56, to produce an estimated channel response with increased accuracy. If A is the unknown channel-induced complex gain acting on the first long preamble symbol 52, and n1 is the noise corrupting the observation of the corresponding tone value, the observation of this tone in the first preamble symbol 52 can be represented as:

$$y1=Ax+n1.$$

where x is a known value corresponding to a transmission amplitude for the first preamble symbol. Likewise, the observation of the same frequency tone in the second preamble symbol 54 be represented as:

$$y2=Ax+n2$$

where n2 is the noise that corrupts this second observation, and x is a known value corresponding to a transmission amplitude for the second preamble symbol. The value of x for the first and second preamble symbols is identical. The noise value n2 is typically independent of n1, although the two values are identically distributed. Maximum likelihood estimation of the unknown parameter A given y1 and y2 involves maximizing the conditional probability density function (pdf) or the likelihood function $$p(y1,y2/A)=p(y1/A)p(y2/A)$$

with respect to A. If the two pdfs in the right hand side of the equation are Gaussian, this maximization is equivalent to minimizing the expression:

$$|y1-Ax|^2+|y2-Ax|^2$$

This minimization step leads to the estimate:

$$A=(y1+y2)/2x$$

which represents the optimal solution for an IEEE 802.11a standard based system that utilize the two long preamble symbols 52, 54.

To improve the estimate of A, a technique in accordance with the invention considers observation of a third tone. According to the IEEE 802.11a specification, and as illustrated in FIG. 4, a signal field 56 follows the two long preamble symbols 52, 54. Signal field 56 contains information that is necessary to decode data, such as rate and length information. Advantageously, signal field 56 runs at a low, and thus a reliable, transmission rate, e.g., 6 megabits per second. Also, signal field 56 is modulated using the binary phase shift keying (BPSK) technique where the tone value takes on either +1 or −1.

There is no way to determine the tone value associated with signal field 56 with 100% certainty at the receiver side. At reasonable operating conditions, however, channel estimator 44 can make a reliable guess as to whether the received tone is supposed to be +1 or −1, e.g., by a simple slicing operation that determines whether the received tone is closer to +1 or to −1. The determined tone value then can be treated as a true transmitted value, and accepted as a third tone value observation for the specific frequency bin of interest for frequency domain equalization. Thus, in addition to the two observations corresponding to preamble symbols 52, 54, the technique makes use of another observation of the same frequency tone but corresponding to signal field 56, promoting increased accuracy. The third observation is an expected value.

In particular, the estimation technique may use another observation of the same frequency tone corresponding to:

$$y3=Az+n3$$

where n3 is a noise sample applicable to the tone carried by signal field 56, and z is an expected value corresponding to a transmission amplitude for the signal field. Noise value n3 is distributed identically to but independently of noise values n1 and n2. With a third tone observation, channel estimator 44 can estimate the complex channel gain A by maximizing the following expression:

$$p(y1, y2, y3/A)=p(y1/A)p(y2/A)p(y3/A)$$

This expression reduces to the problem of finding the value of A that minimizes:

$$|y1-Ax|^2+|y2-Ax|^2+|y3-Az|^2$$

Solving this minimization problem for A yields the new estimate:

$$A=[x*(y1+y2)+z*y3]/(2|x|^2+|z|^2)$$

where * represents the complex conjugate operation.

Figure 5:
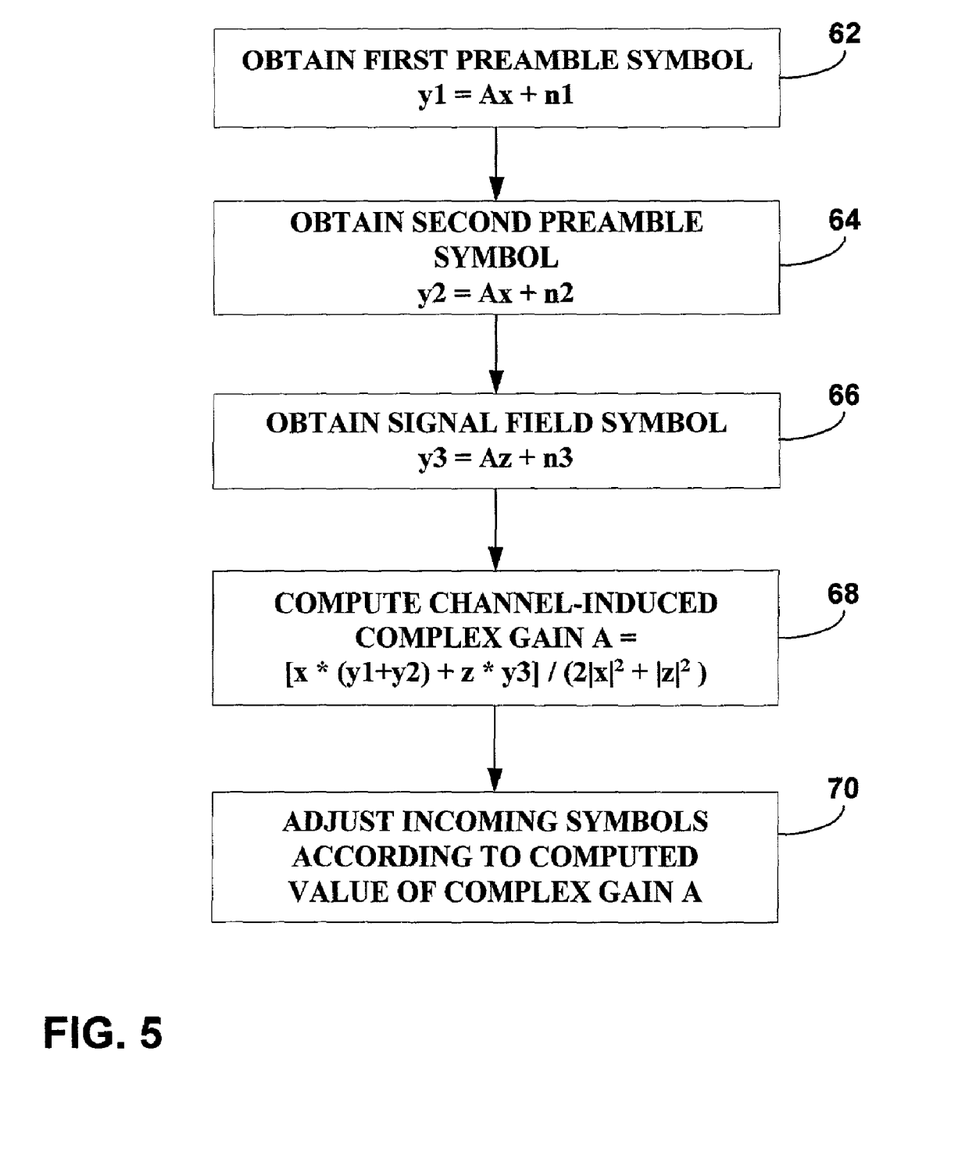
FIG. 5 is a flow diagram illustrating a frequency domain equalization technique according to an embodiment of the invention.

FIG. 5 is a flow diagram illustrating a frequency domain equalization technique according to an embodiment of the invention. As shown in FIG. 5, and as described above, the technique involves obtaining a first preamble symbol y1=Ax+n1 (60) and obtaining a second preamble symbol y2=Ax+n2 (62). Thus, the technique involves obtaining two preamble symbols from an OFDM frame, such as the long preamble symbols in an 802.11a frame. In accordance with the invention, the technique further includes obtaining a third symbol from the OFDM frame, to increase the accuracy of the estimate of channel gain A. Specifically, the technique involves obtaining an additional observation of a symbol y3=Az+n3 from the signal field of an OFDM frame (64), e.g., an 802.11a frame. Upon computing the channel-induced complex gain A (66) according to the function:

$$A=[x*(y1+y2)+z*y3]/(2|x|^2+|z|^2),$$

channel estimator 44 applies a gain value to detector 42. Detector 42 then adjusts its response to incoming symbols according to the computed value of the complex gain A (68) to aid in detection performance, and mitigate the effects of inter-symbol interference.

For embodiments in which channel estimator 44 is realized by programmed features of a processor, machine-readable instructions to drive the function of channel estimator 44 may be stored within any one of a variety of different machine-readable media including random-access memory (RAM), non-volatile memory, magnetic storage media, optical storage media, and the like. The instructions can be accessed and executed by the processor during operation to carry out one or more of the features and functions described herein.

Both the estimate using three observations and an estimate based on values for only the two long preamble symbols are unbiased. The variance of this estimate can be represented by:

$$var3=\sigma^2/(2|x|+|z|)$$

where $\sigma^2$ is the variance of n1, n2 or n3. In comparison, the variance of the previous estimate can be represented by:

$$var2=\sigma^2/2|x|.$$

Thus, the gain that is achieved in terms of a reduced variance by use of the additional observation from the signal field can be represented as:

$$G=10 \log 10[(2|x|+|z|)/2|x|]dB.$$

According to the IEEE 802.11a specification, x and z, the values for the long preamble and signal fields, respectively, can only take the value of +1 or −1. As a result, the gain becomes:

$$G=10 \log 10[(2|1|+|1|)/2|1|]dB, \text{ or}$$

$$G=10 \log 10(1.5)=1.76 \text{ dB}.$$

When the signal-to-noise ratio associated with the given frequency bin is very low, then the detected amplitude z could be erroneous. To handle such situations, channel estimator 44 can be modified to use the alternative formula:

$$A=[x*(y1+y2)+\alpha z*y3]/(2|x|^2+\alpha|z|^2)$$

where $\alpha$ is an adjustable parameter that can change from 0 to 1, depending on the observed amplitude of the tone in the signal field. For example, the value of $\alpha$ can be set to zero if the real part of the observation is close to zero, i.e., less than a predetermined threshold value. Alternatively, the value of $\alpha$ can be set to one if the magnitude of the real component is greater than or equal to the threshold value. In general, the value of $\alpha$ is a function of the magnitude of the real component of the observation sample in the signal field. Note that channel estimator 44 also yields an unbiased estimate with this alternative approach.

Various embodiments of the invention have been described. These and other embodiments are within the scope of the following claims.

The invention claimed is:

1. A method comprising:
   receiving, in a wireless receiver, an orthogonal frequency division multiplexing (OFDM) frame transmitted via a wireless channel;
   obtaining an amplitude y1 for a first preamble symbol in the OFDM frame;
   obtaining an amplitude y2 for a second preamble symbol in the OFDM frame;
   obtaining an amplitude y3 for a signal field in the OFDM frame; estimating a complex gain A for the channel according to the equation:

$$A=[x*(y1+y2)+z*y3]/(2|x|^2+|z|^2),$$

wherein x is a known value corresponding to a transmission amplitude for each of the first and second preamble symbols, z is an expected value corresponding to a transmission amplitude for the signal field, and * represents the complex conjugate operation; and
   adjusting detection of symbols in the OFDM frame based on the estimated complex gain.

2. The method of claim 1, wherein the signal field contains rate and length information for the OFDM frame.

3. The method of claim 1, further comprising applying the estimated complex gain to adjust a data detector that receives a wireless signal containing the OFDM frame.

4. The method of claim 1, wherein the OFDM frame conforms to the IEEE 802.11a standard.

5. The method of claim 1, further comprising estimating the complex gain A for the channel according to the equation:

$$A=[x*(y1+y2)+\alpha z*y3]/(2|x|^2+\alpha|z|^2),$$

wherein $\alpha$ is an adjustable parameter.

6. The method of claim 5, further comprising adjusting the value of the parameter $\alpha$ to alternate between 0 and 1 based on the observed amplitude y3.

7. The method of claim 5, wherein the amplitude y3 is a complex value, the method further comprising setting the value of the parameter $\alpha$ to 0 if a real component of the amplitude y3 is less than a threshold value, and setting the value of the parameter $\alpha$ to 1 if the real component of the amplitude y3 is greater than or equal to the threshold value.

8. A system comprising:
   a receiver that obtains an amplitude y1 for a first preamble symbol in an orthogonal frequency division multiplexing (OFDM) frame transmitted via a wireless channel, obtains an amplitude y2 for a second preamble symbol in the OFDM frame, and obtains an amplitude y3 for a signal field in the OFDM frame; and
   a channel estimator that estimates a complex gain A for the channel according to the equation:

$$A=[x*(y1+y2)+z*y3]/(2|x|^2+|z|^2),$$

wherein x is a known value corresponding to a transmission amplitude for each of the first and second preamble symbols, z is an expected value corresponding to a transmission amplitude for the signal field, and represents the complex conjugate operation.

9. The system of claim 8, wherein the signal field contains rate and length information for the OFDM frame.

10. The system of claim 8, wherein the channel estimator applies the estimated complex gain to adjust a data detector that receives a wireless signal containing the OFDM frame.

11. The system of claim 8, wherein the OFDM frame conforms to the IEEE 802.11a standard.

12. The system of claim 8, wherein the channel estimator estimates the complex gain A for the channel according to the equation:

$$A=[x^*(y1+y2)+\alpha z^*y3]/(2|x|^2+\alpha|z|^2),$$

wherein $\alpha$ is an adjustable parameter.

13. The system of claim 12, wherein the channel estimator adjusts the value of the parameter $\alpha$ to alternate between 0 and 1 based on the observed amplitude y3.

14. The system of claim 12, wherein the amplitude y3 is a complex value, and the channel estimator sets the value of the parameter $\alpha$ to 0 if a real component of the amplitude y3 is less than a threshold value, and sets the value of the parameter $\alpha$ to 1 if the real component of the amplitude y3 is greater than or equal to the threshold value.

15. A method comprising:
receiving, in a wireless receiver, an orthogonal frequency division multiplexing (OFDM) frame transmitted via a wireless channel;
obtaining amplitudes for at least three different symbols in the OFDM frame;
estimating a complex gain for the channel based on the amplitudes, wherein one of the symbols is a signal field symbol containing rate and length information for the OFDM frame; and
adjusting detection of symbols in the OFDM frame based on the estimated complex gain.

16. The method of claim 15, wherein obtaining amplitudes for three different symbols includes obtaining amplitudes for a first preamble symbol, a second preamble symbol and the signal field symbol.

17. The method of claim 15, further comprising applying the estimated complex gain to adjust a data detector that receives a wireless signal containing the OFDM frame.

18. The method of claim 15, wherein the OFDM frame conforms to the IEEE 802.11a standard.

19. The method of claim 15, further comprising estimating the complex gain A for the channel according to the equation:

$$A=[x^*(y1+y2)+z^*y3]/(2|x|^2+|z|^2),$$

wherein y1 is the amplitude for a first preamble symbol in the OFDM frame, y2 is the amplitude for a second preamble symbol in the OFDM frame, y3 is the amplitude for the signal field symbol in the signal field in the OFDM frame, x is a known value corresponding to a transmission amplitude for each of the first and second preamble symbols, z is an expected value corresponding to a transmission amplitude for the signal field, and * represents the complex conjugate operation.

20. The method of claim 19, further comprising estimating the complex gain A for the channel according to the equation:

$$A=[x^*(y1+y2)+\alpha z^*y3]/(2|x|^2+\alpha|z|^2),$$

wherein $\alpha$ is an adjustable parameter.

21. The method of claim 20, further comprising adjusting the value of the parameter $\alpha$ to alternate between 0 and 1 based on the observed amplitude.

22. The method of claim 20, wherein the amplitude y3 is a complex value, the method further comprising setting the value of the parameter $\alpha$ to 0 if a real component of the amplitude y3 is less than a threshold value, and setting the value of the parameter $\alpha$ to 1 if the real component of the amplitude y3 is greater than or equal to the threshold value.

23. The method of claim 15, wherein each of the amplitudes obtained for the at least three different symbols is one of a known amplitude and an expected amplitude.

24. A system comprising:
a receiver that obtains amplitudes for at least three different symbols in an orthogonal frequency division multiplexing (OFDM) frame transmitted via a wireless channel; and
a channel estimator that estimates a complex gain for the channel based on the amplitudes, wherein one of the symbols is a signal field symbol containing rate and length information for the OFDM frame.

25. The system of claim 24, wherein the amplitudes include amplitudes for a first preamble symbol, a second preamble symbol and the signal field symbol.

26. The system of claim 24, further wherein the channel estimator applies the estimated complex gain to adjust a data detector that receives a wireless signal containing the OFDM frame.

27. The system of claim 24, wherein the OFDM frame conforms to the IEEE 802.11a standard.

28. The system of claim 24, wherein the channel estimator estimates the complex gain A for the channel according to the equation:

$$A=[x^*(y1+y2)+z^*y3]/(2|x|^2+|z|^2),$$

wherein y1 is the amplitude for a first preamble symbol in the OFDM frame, y2 is the amplitude for a second preamble symbol in the OFDM frame, y3 is the amplitude for the signal field symbol in the OFDM frame, x is a known value corresponding to a transmission amplitude for each of the first and second preamble symbols, z is an expected value corresponding to a transmission amplitude for the signal field, and * represents the complex conjugate operation.

29. The system of claim 28, wherein the channel estimator estimates the complex gain A for the channel according to the equation:

$$A=[x^*(y1+y2)+\alpha z^*y3]/(2|x|^2+\alpha|z|^2),$$

wherein $\alpha$ is an adjustable parameter.

30. The system of claim 29, wherein the channel estimator adjusts the value of the parameter $\alpha$ to alternate between 0 and 1 based on the observed amplitude.

31. The system of claim 29, wherein the amplitude y3 is a complex value, and the channel estimator sets the value of the parameter $\alpha$ to 0 if a real component of the amplitude y3 is less than a threshold value, and sets the value of the parameter $\alpha$ to 1 if the real component of the amplitude y3 is greater than or equal to the threshold value.

32. The system of claim 24, wherein each of the amplitudes obtained for the at least three different symbols is one of a known amplitude and an expected amplitude.

33. A machine-readable medium comprising instructions to cause a processor to:

obtain an amplitude y1 for a first preamble symbol in an orthogonal Frequency division multiplexing (OFDM) frame transmitted via a wireless channel and received in a wireless receiver;

obtain an amplitude y2 for a second preamble symbol in the OFDM frame;

obtain an amplitude y3 for a signal field in the OFDM frame;

estimate a complex gain A for the channel according to the equation:

$$A=[x*(y1+y2)+z*y3]/(2|x|^2+|z|^2),$$

wherein x is a known value corresponding to a transmission amplitude for each of the first and second preamble symbols, z is an expected value corresponding to a transmission amplitude fox the signal field, and * represents the complex conjugate operation; and adjust detection of symbols in the OFDM frame based on the estimated complex gain.

34. The machine-readable medium of claim 33, wherein the signal field contains rate and length information for the OFDM frame.

35. The machine-readable medium of claim 33, wherein the OFDM frame conforms to the IEEE 802.11a standard.

36. The machine-readable medium of claim 33, wherein the instructions cause the processor to estimate the complex gain A for the channel according to the equation:

$$A=[x*(y1+y2)+\alpha z*y3](2|x|^2+\alpha|z|^2),$$

wherein α is an adjustable parameter.

37. The machine-readable medium of claim 36, wherein the instructions cause the processor to set the value of the parameter α to alternate between 0 and 1 based on the observed amplitude y3.

38. The machine-readable medium of claim 36, wherein the amplitude y3 is a complex value, and the instructions cause the processor to set the value of the parameter α to 0 if a real component of the amplitude y3 is less than a threshold value, and set the value of the parameter α to 1 if the real component of the amplitude y3 is greater than or equal to the threshold value.

39. A machine-readable medium comprising instructions to cause a processor to:

obtain amplitudes far at least three different symbols in an orthogonal frequency division multiplexing (OFDM) frame transmitted via a wireless channel and received in a wireless receiver;

estimate a complex gain for the channel based on the amplitudes, wherein one of the symbols is a signal field symbol containing rate and length information for the OFDM frame; and adjust detection of symbols in the OFDM frame based on the estimated complex gain.

40. The machine-readable medium of claim 39, wherein the amplitudes include amplitudes for a first preamble symbol, a second preamble symbol and the signal field symbol.

41. The machine-readable medium of claim 39, wherein the OFDM frame conforms to the IEEE 802.11a standard.

42. The machine-readable medium of claim 39, wherein the instructions cause the processor to estimate the complex gain A for the channel according to the equation:

$$A=[x*(y1+y2)+z*y3]/(2|x|^2+|z|^2),$$

wherein y1 is the amplitude for a first preamble symbol in the OFDM frame, y2 is the amplitude for a second preamble symbol in the OFDM frame, y3 is the amplitude for the signal field symbol in the OFDM frame, x is a known value corresponding to a transmission amplitude for each of the first and second preamble symbols, z is an expected value corresponding to a transmission amplitude for the signal field, and represents the complex conjugate operation.

43. The machine-readable medium of claim 39, wherein the instructions cause the processor to estimate the complex gain A for the channel according to the equation:

$$A=[x*(y1+y2)+\alpha z*y3]/(2|x|^2+\alpha|z|^2),$$

wherein α is an adjustable parameter.

44. The machine-readable medium of claim 43, wherein the instructions cause the processor to adjust the value of the parameter α to alternate between 0 and 1 based on the observed amplitude.

45. The machine-readable medium of claim 43, wherein the amplitude y3 is a complex value, and the instructions cause the processor to set the value of the parameter α to 0 if a real component of the amplitude y3 is less than a threshold value, and set the value of the parameter α to 1 if the real component of the amplitude y3 is greater than or equal to the threshold value.

46. The machine-readable medium of claim 39, wherein each of the amplitudes obtained for the at least three different symbols is one of a known amplitude and an expected amplitude.

47. A method comprising:

receiving, in a wireless receiver, an orthogonal frequency division multiplexing (OFDM) frame transmitted via a wireless channel obtaining an amplitude for a preamble symbol in the OFDM frame;

obtaining an amplitude for a non-preamble symbol in the OFDM frame;

estimating a complex gain for the channel based on the amplitudes of the preamble symbol and the non-preamble symbol; and adjusting detection of symbols in the OFDM frame based on the estimated complex gain, wherein the amplitude of the preamble symbol is a known amplitude, and the amplitude of the non-preamble symbol is an expected amplitude.

48. The method of claim 47, wherein the non-preamble symbol is carried in a signal field of the OFDM frame.

49. The method of claim 47, wherein obtaining an amplitude for a preamble symbol includes obtaining amplitudes for first and second preamble symbols in the OFDM frame.

50. A system comprising:

a receiver that obtains an amplitude for a preamble symbol in an orthogonal frequency division multiplexing (OFDM) frame transmitted via a wireless channel, and obtains an amplitude for a non-preamble symbol in the OFDM frame; and a channel estimator that estimates a complex gain for the channel based on the amplitudes of the preamble symbol and the non-preamble symbol, wherein the amplitude of the preamble symbol is a known amplitude, and the amplitude of the non-preamble symbol is an expected amplitude.

51. The system of claim 50, wherein the non-preamble symbol is carried in a signal field of the OFDM frame.

52. The system of claim 50, wherein the receiver obtains the amplitude for a preamble symbol by obtaining amplitudes for first and second preamble symbols in the OFDM frame.

53. A machine-readable medium comprising instructions to cause a processor to:

obtain an amplitude for a preamble symbol in an orthogonal frequency division multiplexing (OFDM) frame transmitted via a wireless channel and received in a wireless receiver;

obtain an amplitude for a non-preamble symbol in the OFDM frame; and estimate a complex gain for the channel based on the amplitudes of the preamble symbol and the non-preamble symbol; and adjust detection of symbols in the OFDM frame based on the estimated complex gain, wherein the amplitude of the preamble symbol is a known amplitude, and the amplitude of the non-preamble symbol is an expected amplitude.

54. The machine-readable medium of claim 53, wherein the non-preamble symbol is carried in a signal field of the OFDM frame.

55. The machine-readable medium of claim 53, wherein the instructions cause the processor to obtain an amplitude for a preamble symbol by obtaining amplitudes for first and second preamble symbols in the OFDM frame.

56. A method comprising:

receiving, in a wireless receiver, an orthogonal frequency division multiplexing (OFDM) frame transmitted via a wireless channel obtaining an amplitude for a preamble symbol in the OFDM frame;

obtaining an amplitude for a signal field symbol in the OFDM frame; and estimating a complex gain for the channel based on the amplitudes of the preamble symbol and the signal field symbols; and adjusting detection of symbols in the OFDM frame based on the estimated complex gain, wherein the amplitude of the preamble symbol is a known amplitude, and the amplitude of the signal field symbol is an expected amplitude.

57. The method of claim 56, wherein obtaining an amplitude for a preamble symbol includes obtaining amplitudes for first and second preamble symbols in the OFDM frame.

58. A system comprising:

a receiver that obtains an amplitude for a preamble symbol in an orthogonal frequency division multiplexing (OFDM) frame transmitted via a wireless channel, and obtains an amplitude for a signal field symbol in the OFDM frame; and a channel estimator that estimates a complex gain for the channel based on the amplitudes of the preamble symbol and the signal field symbol, wherein the amplitude of the preamble symbol is a known amplitude, and the amplitude of the signal field symbol is an expected amplitude.

59. The system of claim 58, wherein the receiver obtains the amplitude for a preamble symbol by obtaining amplitudes for first and second preamble symbols in the OFDM frame.

60. A machine-readable medium comprising instructions to cause a processor to:

obtain an amplitude for a preamble symbol in an orthogonal frequency division multiplexing (OFDM) frame transmitted via a wireless channel and received in a wireless receiver;

obtain an amplitude for a signal field symbol in the OFDM frame;

estimate a complex gain for the channel based on the amplitudes of the preamble symbol and the signal field symbol; and adjust detection of symbols in the OFDM frame based on the estimated complex gain, wherein the amplitude of the preamble symbol is a known amplitude, and the amplitude of the signal field symbol is an expected amplitude.

61. The machine-readable medium of claim 60, wherein the instructions cause the processor to obtain an amplitude for a preamble symbol by obtaining amplitudes for first and second preamble symbols in the OFDM frame.

62. A method comprising:

receiving, in a wireless receiver, an orthogonal frequency division multiplexing (OFDM) frame transmitted via a wireless channel obtaining an amplitude for a signal field symbol in the OFDM frame;

estimating a complex gain for the channel based on the amplitude of the signal field symbol; and adjusting detection of symbols in the OFDM frame based on the estimated complex gain, wherein the amplitude of the signal field symbol is an expected amplitude.

63. The method of claim 62, further comprising obtaining an amplitude for a first preamble symbol and a second preamble symbol in the OFDM frame and estimating the complex gain for the channel based on the amplitudes of the signal field symbol, the first preamble symbol, and the second preamble symbol.

64. The method of claim 63, wherein the amplitudes of the first and second preamble symbol are known amplitudes.

65. A system comprising:

a receiver that obtains an amplitude for a signal field symbol in an orthogonal frequency division multiplexing (OFDM) frame transmitted via a wireless channel; and a channel estimator that estimates a complex gain for the channel based on the amplitude of the signal field symbol, wherein the amplitude of the signal field symbol is an expected amplitude.

66. The system of claim 65, wherein the receiver obtains an amplitude for a first preamble symbol and a second preamble symbol in the OFDM frame and estimates the complex gain for the channel based on the amplitudes of the signal field symbol, the first preamble symbol, and the second preamble symbol.

67. The system of claim 66, wherein the amplitudes of the first and second preamble symbol are known amplitudes.

68. A machine-readable medium comprising instructions to cause a processor to:

obtain an amplitude for a signal field symbol in an orthogonal frequency division multiplexing (OFDM) frame transmitted via a wireless channel and received in a wireless receiver;

estimate a complex gain for the channel based on the amplitude of the signal field symbol; and adjust detection of symbols in the OFDM frame based on the estimated complex gain, wherein the amplitude of the signal field symbol is an expected amplitude.

69. The machine-readable medium of claim 68, wherein the instructions cause the processor to obtain an amplitude for a first preamble symbol and a second preamble symbol in the OFDM frame and estimate the complex gain for the channel based on the amplitudes of the signal field symbol, the first preamble symbol, and the second preamble symbol.

70. The machine-readable medium of claim 69, wherein the amplitudes of the first and second preamble symbols are known amplitudes.

71. A method comprising:
- receiving, in a wireless receiver, an orthogonal frequency division multiplexing (OFDM) frame transmitted via a wireless channel
- obtaining an amplitude for a signal field symbol in the OFDM frame;
- estimating a complex gain for the channel based an the amplitude of the signal field symbol; and
- adjusting detection of symbols in the OFDM frame based on the estimated complex gain,
- wherein the signal field symbol contains rate and length information for the OFDM frame.

72. The method of claim 71, further comprising obtaining an amplitude for a first preamble symbol and a second preamble symbol in the OFDM frame and estimating the complex gain for the channel based on the amplitudes of the signal field symbol, the first preamble symbol, and the second preamble symbol.

73. A system comprising:
- a receiver that obtains an amplitude for a signal field symbol in an orthogonal frequency division multiplexing (OFDM) frame transmitted via a wireless channel; and
- a channel estimator that estimates a complex gain for the channel based on the amplitude of the signal field symbol,
- wherein the signal field symbol contains rate and length information for the OFDM frame.

74. The system of claim 73, wherein the receiver obtains an amplitude for a first preamble symbol and a second preamble symbol in the OFDM frame and estimates the complex gain for the channel based on the amplitudes of the signal field symbol, the first preamble symbol, and the second preamble symbol.

75. A machine-readable medium comprising instructions to cause a processor to:
- obtain an amplitude for a signal field symbol in an orthogonal frequency division multiplexing (OFDM) frame transmitted via a wireless channel and received in a wireless receiver; and
- estimate a complex gain for the channel based on the amplitude of the signal field symbol; and
- adjust detection of symbols in the OFDM frame based on the estimated complex gain,
- wherein the signal field symbol contains rate and length information for the OFDM frame.

76. The machine-readable medium of claim 75, wherein the instructions cause the processor to obtain an amplitude for a first preamble symbol and a second preamble symbol in the OFDM frame and estimate the complex gain for the channel based on the amplitudes of the signal field symbol, the first preamble symbol, and the second preamble symbol.

* * * * *

UNITED STATES PATENT AND TRADEMARK OFFICE
CERTIFICATE OF CORRECTION

PATENT NO.       : 7,099,267 B2                                Page 1 of 1
APPLICATION NO.  : 10/112916
DATED            : August 29, 2006
INVENTOR(S)      : Jaekyun Moon It is certified that error appears in the above-identified patent and that said Letters Patent is hereby corrected as shown below:

On column 9, line 4, (claim 8), add --*-- after "and"

On column 11, line 2, (claim 33) "Frequency" should read --frequency--

On column 11, line 28, (claim 36), add --/-- after the "]" in the equation so it reads:
--A=[x*(y1+y2)+αz*y3]/(2|x|$^2$+α|z|$^2$)--

On column 11, line 44, (claim) 39, "far" should read --for--

On column 12, line 5, (claim 42), add --*-- after "and"

On column 13, line 32, (claim 56), "symbols" should read --symbol--

Signed and Sealed this

Thirteenth Day of March, 2007

JON W. DUDAS
*Director of the United States Patent and Trademark Office*